(12) United States Patent
Guo et al.

(10) Patent No.: US 7,505,033 B2
(45) Date of Patent: Mar. 17, 2009

(54) SPECKLE-BASED TWO-DIMENSIONAL MOTION TRACKING

(75) Inventors: Li Guo, Hefei (CN); Tian Qiu, Hefei (CN); Donghui Li, Hefei (CN); Jun Liu, Hefei (CN); Ting Gong, Hefei (CN); Yuan Kong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 11/272,415

(22) Filed: Nov. 14, 2005

(65) Prior Publication Data

US 2007/0109268 A1    May 17, 2007

(51) Int. Cl.
G06F 3/033   (2006.01)
(52) U.S. Cl. .................. 345/166; 345/156; 345/163
(58) Field of Classification Search ............. 345/156, 345/157, 163, 166, 167; 463/37, 38
See application file for complete search history.

(56) References Cited

U.S. PATENT DOCUMENTS

| | | | |
|---|---|---|---|
| 3,954,335 A | 5/1976 | Bodlaj | |
| 4,240,745 A | 12/1980 | Green | |
| 4,379,968 A | 4/1983 | Ely et al. | |
| 4,417,824 A | 11/1983 | Paterson et al. | |
| 4,641,026 A | 2/1987 | Garcia | |
| 4,721,385 A | 1/1988 | Jelalian et al. | |
| 4,794,384 A * | 12/1988 | Jackson | 345/166 |
| 5,114,226 A | 5/1992 | Goodwin et al. | |
| 5,125,736 A | 6/1992 | Vaninetti et al. | |
| 5,274,361 A | 12/1993 | Snow | |
| 5,274,363 A | 12/1993 | Koved et al. | |
| 5,369,262 A | 11/1994 | Dvorkis et al. | |
| 5,475,401 A | 12/1995 | Verrier et al. | |
| 5,510,604 A | 4/1996 | England | |
| 5,515,045 A | 5/1996 | Tak | |

(Continued)

FOREIGN PATENT DOCUMENTS

EP    1107101    6/2001

(Continued)

OTHER PUBLICATIONS

Hewett, Jacqueline, "Holey VCSELs Produce High Powers", <http://www.optics.org/articles/news/10/12/5/1>, date of first publication unknown, but dated Dec. 2004; 2 pages.

(Continued)

*Primary Examiner*—Chanh Nguyen
*Assistant Examiner*—Jonathan Blancha
(74) *Attorney, Agent, or Firm*—Merchant & Gould P.C.

(57) ABSTRACT

A relatively moving surface is illuminated with a laser. Light from the laser is reflected by the surface into an array of photosensitive elements; the reflected light includes a speckle pattern. Sums are calculated for outputs of pixels perpendicular to a first dimension along which motion is to be determined. Motion along the first dimension is then determined based on spatial and temporal gradients of the calculated sums. Sums are also calculated for outputs of pixels perpendicular to a second dimension along which motion is to be determined. Motion along the second dimension is then determined based on spatial and temporal gradients of those sums. The array may be rectangular, or may contain arms separated by a pixel-free region.

16 Claims, 5 Drawing Sheets

U.S. PATENT DOCUMENTS

| | | | |
|---|---|---|---|
| 5,629,594 | A | 5/1997 | Jacobus et al. |
| 5,781,297 | A | 7/1998 | Castore |
| 5,808,568 | A | 9/1998 | Wu |
| 5,994,710 | A | 11/1999 | Knee et al. |
| 6,015,089 | A | 1/2000 | Hecht et al. |
| 6,040,914 | A | 3/2000 | Bortz et al. |
| 6,246,482 | B1 | 6/2001 | Kinrot et al. |
| 6,300,940 | B1 | 10/2001 | Ebina et al. |
| 6,303,924 | B1 | 10/2001 | Adan et al. |
| 6,333,735 | B1 | 12/2001 | Anvekar |
| 6,373,047 | B1 | 4/2002 | Adan et al. |
| 6,489,934 | B1 | 12/2002 | Klausner |
| 6,525,677 | B1 | 2/2003 | Printzis |
| 6,552,713 | B1 | 4/2003 | Van Brocklin et al. |
| 6,585,158 | B2 | 7/2003 | Norskog |
| 6,646,723 | B1 | 11/2003 | Dubovitsky et al. |
| 6,687,274 | B2 | 2/2004 | Kahen |
| 6,707,027 | B2 | 3/2004 | Liess et al. |
| 6,868,433 | B1 | 3/2005 | Philyaw |
| 6,872,931 | B2 | 3/2005 | Liess et al. |
| 6,903,662 | B2 | 6/2005 | Rix et al. |
| 7,085,584 | B2 | 8/2006 | Shima |
| 7,138,620 | B2 * | 11/2006 | Trisnadi et al. ............. 250/221 |
| 7,268,705 | B2 | 9/2007 | Kong |
| 7,283,214 | B2 | 10/2007 | Xu et al. |
| 2001/0035861 | A1 | 11/2001 | Ericson et al. |
| 2001/0055195 | A1 | 12/2001 | Suzuki |
| 2002/0117549 | A1 | 8/2002 | Lee |
| 2002/0130183 | A1 | 9/2002 | Vinogradov et al. |
| 2002/0158838 | A1 | 10/2002 | Smith et al. |
| 2002/0198030 | A1 | 12/2002 | Shima |
| 2003/0006367 | A1 | 1/2003 | Liess et al. |
| 2003/0085284 | A1 | 5/2003 | Bremer et al. |
| 2003/0085878 | A1 | 5/2003 | Luo |
| 2003/0128188 | A1 | 7/2003 | Wilbrink et al. |
| 2003/0128190 | A1 | 7/2003 | Wilbrink et al. |
| 2003/0132914 | A1 | 7/2003 | Lee |
| 2003/0136843 | A1 | 7/2003 | Ralph et al. |
| 2003/0142288 | A1 * | 7/2003 | Kinrot et al. .................. 356/28 |
| 2004/0004128 | A1 | 1/2004 | Pettinelli et al. |
| 2004/0004603 | A1 | 1/2004 | Gerstner et al. |
| 2004/0075823 | A1 | 4/2004 | Lewis et al. |
| 2004/0095323 | A1 | 5/2004 | Ahn |
| 2004/0109019 | A1 | 6/2004 | Miyamoto et al. |
| 2004/0213311 | A1 | 10/2004 | Johnson et al. |
| 2004/0227954 | A1 | 11/2004 | Xie |
| 2004/0228377 | A1 | 11/2004 | Deng et al. |
| 2004/0246460 | A1 | 12/2004 | Auracher et al. |
| 2005/0007343 | A1 | 1/2005 | Butzer |
| 2005/0044179 | A1 | 2/2005 | Hunter |
| 2005/0068300 | A1 | 3/2005 | Wang et al. |
| 2005/0134556 | A1 | 6/2005 | VanWiggeren et al. |
| 2005/0156875 | A1 | 7/2005 | Kong |
| 2005/0157202 | A1 | 7/2005 | Lin et al. |
| 2005/0168445 | A1 * | 8/2005 | Piot et al. .................... 345/163 |
| 2005/0179658 | A1 | 8/2005 | Huang et al. |
| 2005/0231484 | A1 | 10/2005 | Gordon et al. |
| 2005/0243055 | A1 * | 11/2005 | Ranta et al. ................. 345/156 |
| 2006/0066576 | A1 | 3/2006 | Kong |
| 2006/0213997 | A1 | 9/2006 | Frank et al. |
| 2006/0245518 | A1 | 11/2006 | Wang |
| 2006/0262096 | A1 | 11/2006 | Panabaker et al. |
| 2007/0002013 | A1 | 1/2007 | Kong et al. |
| 2007/0102523 | A1 | 5/2007 | Kong |
| 2007/0109267 | A1 | 5/2007 | Guo et al. |

FOREIGN PATENT DOCUMENTS

| | | |
|---|---|---|
| GB | 2383231 A | 6/2003 |
| WO | 0028455 | 5/2000 |
| WO | WO2005/055037 | 6/2005 |
| WO | WO 2005/076116 A2 | 8/2005 |

OTHER PUBLICATIONS

"Ultra-miniature Laser Displacement Sensors", <http://www.globalspec.com/FeaturedProducts/Detail/BaumerElectric/Ultraminiature_Laser_Displacement_Sensors/13470/1>, first date of publication unknown, but prior to Sep. 12, 2005, 2 pages.

Nerin, P., et al., "Absolute Distance and Velocity Measurements by the FMCW Technique and Self-Mixing Interference Effect Inside a Single-Mode Nd:YAG-LiTAO$_3$ Microchip Laser", Journal of Optics, vol. 29, No. 3, Jun. 1998.

Lowery, James, et al., "Design and Simulation of a Simple Laser Rangefinder Using a Semiconductor Optical Amplifier-Detector", Optics Express, vol. 13, No. 10, May 16, 2005; pp. 3647-3652.

Maier, T., et al., "A Compact Sensor for Interferometric Displacement Measurements", <http://www.fke.tuwien.ac.at/Publications/jb/fdjb99/tm.htm>, first date of publication unknown, but dated 1999, 2 pages.

"Laser Sensors Offer Long Stand-off and Measurement Range", ThomasNet Industrial news Room, <http://www.news.thomasnet.com/fullstory/458005/1782>, date of first publication unknown, but dated Dec. 3, 2004, 5 pages.

T. Bosch, et al., "The Self-Mixing Interference Inside a Laser Diode: Application to Displacement, Velocity and Distance Measurement", Proc. SPIE, vol. 3478, pp. 98-108, Jul. 1998.

Shigenobu Shinohara, et al., "Compact and High-Precision Range Finder with Wide Dynamic Range and its Application", IEEE Transactions on Instrumentation and Measurement, vol. 41, No. 1, pp. 40-44, Feb. 1992.

Roland E. Best, "Phase-Locked Loops, Theory, Design, and Applications", McGraw-Hill Book Company, pp. 151-164, 1984 (15 pages).

H. Yeh, et al., "Localized Fluid Flow Measurements with an He-Ne Laser Spectrometer", Appl. Phys. Lett., vol. 4, No. 10, pp. 176-178, May 15, 1964.

S.W. James, et al., "Fiber Optic Based Reference Beam Laser Doppler Velocimetry", Optics Communications, 119, pp. 460-464, Sep. 15, 1995.

M.J. Rudd, "A New Theoretical Model for the Laser Dopplermeter", J. Phys. E2, pp. 56-58, 1969.

M.J. Rudd, "A Laser Doppler Velocimeter Employing the Laser as a Mixer-Oscillator", J. Phys. E1, Series 2, vol. 1, pp. 723-726, Feb. 21, 1968.

T. Ito, et al., "Integrated Microlaser Doppler Velocimeter", J. Lightwave Tech., vol. 17, No. 1, pp. 30-34, Jan. 1999.

E.T. Shimizu, "Directional Discrimination in the Self-Mixing Type Laser Doppler Velocimeter", Appl. Opt., vol. 25, No. 21, pp. 4541-4544, Nov. 1987.

S.K. Özdemir, et al., "New Speckle Velocimeter Using Two Self-Mixing Laser Diodes", SICE 115C-3, pp. 947-950, Jul. 29-31, 1997.

S.L. Toh, et al., "Whole Field Surface Roughness Measurement by Laser Speckle Correlation Technique", Optics and Laser Technology, 33, pp. 427-434, Jun. 5, 2001.

M. Nagahara, et al., "Real-Time Blood Velocity Measurements in Human Retinal Vein Using the Laser Speckle Phenomenon", Japanese Journal of Opthalmology, 43, pp. 186-195, 1999.

T. Shibata, et al., "Laser Speckle Velocimeter Using Self-Mixing Laser Diode", IEEE Transactions on Instrumentation and Measurement, vol. 45, No. 2, pp. 499-503, Apr. 2, 1996.

S. Kato, et al., "Optical Fibre Laser Doppler Velocimetry Based on Laser Diode Frequency Modulation", Optical and Laser Technology, vol. 27, No. 4, pp. xii, 1995.

W.H. Stevenson, "Optical Frequency Shifting by means of a Rotating diffraction Grating", Appl. Opt. 9, vol. 9, No. 3, pp. 649-652, Mar. 1970.

M.K. Mazumber, et al., "Laser Doppler Velocity Measurement Without Directional Ambiguity By Using Frequency Shifted Incident Beams", Appl. Phys. Lett., vol. 16, No. 1, pp. 462-464, Jun. 1, 1970.

S. Shinohara, et al., "Laser Doppler Velocimeter Using the Self-Mixing Effect of a Semiconductor Laser Diode", Appl. Opt., vol. 25, No. 9, pp. 1417-1419, 1986.

H.W. Jentink, et al., "Small Laser Doppler Velocimeter Based on the Self-Mixing Effect in a Diode Laser", Appl. Opt. vol. 27, No. 2, pp. 379-385, Jan. 15, 1998.

S. Shinohara, et al., "Acquisition of 3-D Images of Still or Moving Objects Utilizing Laser Diode Range-Finding Speedometer", IEEE, pp. 1730-1735, 1993.

L. Fabiny, et al., "Interferometric Fiber-Optic Doppler Velocimeter with High-Dynamic Range", IEEE Photonics Tech. Lett., vol. 9, No. 1, pp. 79-81, Jan. 1997.

S. Shinohara, et al., "Detection of Mesa Spots and Indents on Slowly Moving Object Surface by Laser-Light Beam Scanning", SICE, 105C-5, pp. 1167-1170, Jul. 26-28, 1995.

Y. Kakiuchi, et al., "Measurement of Small Vibrational Displacement by SM LD Vibrometer with Resonance Element", SICE, 107 A-4, pp. 903-906, Jul. 29-31, 1998.

N. Tsukuda, et al., "New Range-Finding Speedometer Using a Self-Mixing Laser Diode Modulated by Triangular Wave Pulse Current", IEEE, WEAM 4-1, pp. 332-335, May 1994.

Roy Lang, et al., "External Optical Feedback Effects on Semiconductor Injection Laser Properties", IEEE Journal of Quantum Electronics, vol. QE-16, No. 3, pp. 347-355, Mar. 3, 1980.

Acket, G., et al., "The Influence of Feedback Intensity on Longitudinal Mode Properties and Optical Noise in Index-Guided Semiconductor Lasers", IEEE Journal of Quantum Electronics, vol. QE-20, No. 10, pp. 1163-1169, Oct. 1984.

P.J. de Groot, et al., "Ranging and Velocimetry Signal Generation in a Backscatter-Modulated Laser Diode", Appl. Opt., vol. 27, No. 21, pp. 4475-4480, Nov. 1988.

P.A. Porta, "Laser Doppler Velocimetry by Optical Self-Mixing in Vertical-Cavity Surface-Emitting Lasers", IEEE Photonics Technology Letters, vol. 14, No. 12, pp. 1719-1721, Dec. 2002.

S.K. Özdemir, et al., "Effect of Linewidth Enhancement Factor on Doppler Beat Waveform Obtained From a Self-Mixing Laser Diode", Optical Review, vol. 7, No. 6, pp. 550-554, Jun. 22, 2000.

S. Shinohara, et al., "Compact and Versatile Self-Mixing Type Semiconductor Laser Doppler Velocimeters with Direction-Discrimination Circuit", IEEE Transactions on Instrumentation and Measurement, vol. 38, No. 2, pp. 574-577, Apr. 1989.

James H. Churnside, "Laser Doppler Velocimetry by Modulating a $CO_2$ Laser with Backscattered Light", Appl. Opt., vol. 23, No. 1, pp. 61-66, Jan. 1984.

M.H. Koelink, et al., "Laser Doppler Velocimeter Based on the Self-Mixing Effect in a Fiber-Coupled Semiconductor Laser: Theory", Appl. Opt., vol. 31, No. 18, pp. 3401-3408, Jun. 20, 1992.

W.M. Wang, et al., "Self-Mixing Interference in a Diode Laser: Experimental Observations and Theoretical Analysis", Appl. Opt., vol. 32, No. 9, pp. 1551-1558, Mar. 20, 1993.

Guido Giuliani, et al., "Laser Diode Self-Mixing Technique for Sensing Applications", J. Opt. A: Pure Appl. Opt, 4, vol. 4, No. 6, pp. S283-S294, Nov. 4, 2002.

Richard C. Addy, et al., "Effects of External Reflector Alignment in Sensing Applications of Optical Feedback in Laser Diodes", IEEE Journal of Lightwave Technology, Dec., vol. 14, No. 12, pp. 2672-2676, Dec. 1996.

S.F. Yu, "Theoretical Analysis of Polarization Bistability in Vertical Cavity Surface Emitting Semiconductor Lasers", IEEE Journal of Lightwave Technology, vol. 15, No. 6, pp. 1032-1041, Jun. 1997.

F. Robert, et al., "Polarization Modulation Dynamics of Vertical-Cavity Surface-Emitting Lasers with an Extended Cavity", IEEE Journal of Quantum Electronics, vol. 33, No. 12, 2231-2239, Dec. 1997.

J. Danckaert, et al., "Minimal Rate Equations Describing Polarization Switching in Vertical-Cavity Surface-Emitting Lasers", Optics Communications, vol. 201, pp. 129-137, Jan. 2002.

J. Martin-Regalado, et al., "Polarization Properties of Vertical-Cavity Surface-Emitting Lasers", IEEE Journal of Quantum Electronics, vol. 33, No. 5, pp. 765-783, May 1997.

S. Donati, et al., "Laser Diode Feedback Interferometer for Measurement of Displacements Without Ambiguity", IEEE Journal of Quantum Electronics, vol. 31, No. 1, pp. 113-119, Jan. 1995.

K. Petermann, et al., "External Optical Feedback Phenomena in Semiconductor Lasers", IEEE Journal of Selected Topics in Quantum Electronics, vol. 1, No. 2, pp. 480-489, Jun. 1995.

"Optical Mouse Saves Space", <http://www.optics.org/articles/news/8/6/23/1>, date of first publication unknown, but believed to be Jun. 26, 2002.

Wu, Qingguang, et al., "New Vibrometer Using Self-Mixing Laser Diode Modulated with Triangular Current", Shizuoka University, Cleo/Pacific Rim/, pp. 290-291 (1997).

Besnard, Pascal, et al., "Microwave Spectra in External-Cavity Semiconductor Lasers: Theoretical Modeling of Multipass Resonances", IEEE Journal of Quantum Electronics, pp. 1713-1722, (Aug. 1994) vol. 30, No. 8.

Besnard, Pascal, et al., "Feedback Phenomena in a Semiconductor Laser Induced by Distant Reflectors", IEEE Journal of Quantum Electronics, pp. 1271-1284, (May 1993) vol. 29, No. 5.

Short Talk: Fitt's Law & Text Input, New Horizons, "Interface with Pre-Typing Visual Feedback for Touch Sensitive Keyboard", pp. 750-751, CHI 2003.

Bazin, G., et al., "A New Laser Range-Finder Based on FMCW-Like Method", IEEE Instrumentation and Measurement Technology Conference, (1996), pp. 90-93.

Peng, Gang, et al., "Design of 3-D Mouse Using Ultrasonic Distance Measurement", International Conference on Sensors and Control Techniques, pp. 226-229, (2000), Proceedings of SPEI, vol. 4077.

Shinohara, Shigenobu, et al., "High-Resolution Range Finder with Wide Dynamic Range of 0.2m to 1m Using a Frequency-Modulated Laser Diode", pp. 646-651, (1989), IEEE.

Bosch, Thierry, et al., "Three-Dimensional Object Construction Using a Self-Mixing Type Scanning Laser Range Finder", pp. 1326-1329, (1998), IEEE Transactions on Instrumentation and Measurement, vol. 47, No. 5.

Dorsch, Rainer G., et al., "Laser Triangulation: Fundamental Uncertainty in Distance Measurement", pp. 1306-1314, (1994), Applied Optics, vol. 33, No. 7.

Dupuy, D., et al., "A FMCW Laser Range-Finder Based on a Delay Line Technique", pp. 1084-1088, (2001), IEEE Instrumentation and Measurement Technology Conference.

Journet, B., et al., "High Resolution Laser Range-Finder Based on Phase-Shift Measurement Method", pp. 123-132, (1998), SPIE vol. 3520.

Favre-Bulle, Bernard, et al., "Efficient Tracking of 3D-Robot Positions by Dynamic Triangulation", pp. 446-449, (1998), IEEE ITMC Session on Instrumentation and Measurement in Robotics.

Bosch, T, et al., "A Low-Cost, Optical Feedback Laser Range-Finder with Chirp Control", (2001), IEEE Instrumentation and Measurement Technology Conference.

Tucker, John, "Laser Range Finder Using the Self-Mixing Effect in a Vertical Cavity Surface Emitting Laser" (VCSEL), pp. 1-71, (2001).

De Groot, Peter, et al., "Chirped Synthetic-Wavelength Interferometry", pp. 1626-1628, (1992), Optics Letters, vol. 17, No. 22.

Gelmini, E, et al., "Tunable, Double-Wavelength Heterodyne Detection Interferometer for Absolute-Distance Measurements", pp. 213-215, (1994), Optics Letters, vol. 19, No. 3.

IBM Technical Disclosure Bulletin, "Ultrasonic Cursor Position Detection", pp. 6712-6714, (1985), vol. 27, No. 11.

Tucker, J.R., et al., "Laser Range Finding Using the Self-Mixing Effect in a Vertical-Cavity Surface Emitting Laser", pp. 583-586, (2002), Conference on Optoelectronic and Microelectronic Materials and Devices.

Journet, B, et al., "A Low-Cost Laser Range Finder Based on an FMCW-Like Method", pp. 840-843 (2000), IEEE Transactions on Instrumentation and Measurement, vol. 49, No. 4.

Marques, Lino, et al., "3D Laser-Based Sensor for Robotics", pp. 1328-1331, (1994) ISR-Institute of Systems and Robotics.

Marques, Lino, et al., "A New 3D Optical Triangulation Sensor for Robotics", pp. 512-517, (1998), IEEE International Workshop on Advanced Motion Control.

Preucil, Libor, "Building a 2D Environment Map From Laser Range-Finder data", pp. 290-295, (2000), IEEE Intelligent Vehicle Symposium.

Nyland, Lars S., et al., "Capturing, Processing and Rendering Real-World Scenes", IEEE, 2001.

Onodera, Ribun, et al., "Effect of Laser-Diode Power Change on Optical heterodyne Interferometry", pp. 675-681, (1995), Journal of Lightwave Technology, vol. 13, No. 4.

Besesty, Pascal, et al., "Compact FMCW Advanced Laser Range Finder", pp. 552-553, (1999) Technical Digest: Conference on Lasers and Electro-Optics.

Poujouly, Stephane, et al., Digital Laser Range Finder: Phase-Shift Estimation by Undersampling Technique, pp. 1312-1317, (1999), IEEE.

Zheng, Jiang A., "A Flexible Laser Range Sensor Based on Spatial-Temporal Analysis", (2000), Proceedings of the International Conference on Pattern Recognition.

Dandliker, R., et al., "Two-Wavelength Laser Interferometry Using Superheterodyne Detection", pp. 339-341, Optics Letters, (1998) vol. 13, No. 5.

Zou, Q., et al. "Silicon Capacitive Microphones with Corrugated Diaphragms", School of Mechanical and Production Engineering, Nanyang Technological University: date of first publication unknown, but believed to be prior to Sep. 30, 2003.

Rombach, Pirmin, et al., "A Low-Voltage Silicon Condenser Microphone for Hearing Instrument Applications, Microtronic A/S"; date of first publication unknown, but believed to be prior to Sep. 30, 2003.

Shinoda, Yukitaka, et al., "Real-Time Computation of Distance and Displacement by Software Instruments Using Optical Frequency Modulation", pp. 82-83, (2002), SICE.

Cole, Timothy, et al., "Flight Characterization of the Near Laser Rangefinder", pp. 131-142, (2000), Laser Radar Technology and Applications, Proceedings of SPIE vol. 4035.

Viarani, Luigi, et al., "A CMOS Smart Pixel for Active 3-D Vision Applications", pp. 145-152, (2004), IEEE Sensors Journal, vol. 4, No. 1.

Wakitana, Jun, et al., "Wrist-Mounted Laser Rangefinder", pp. 362-367, (1995) Proceedings of the International Conference on Intelligent Robots and Systems.

Zahid, M., et al., "High-Frequency Phase Measurement for Optical Rangefinding System", pp. 141-148, (1997), IEEE Proceedings Science and Measurements Technology, vol. 144, No. 3.

Whetstone, Albert, "Free-Hand Data Input", pp. 11-28, Science Accessories Corporation (1970).

Acroname Articles, Demystifying the Sharp IR Rangers, <http://www.acroname.com/rootics/info/articles/sharp/sharp.html> (First published before Sep. 14, 2004).

Gagnon, Eric, "Laser Range Imaging Using the Self-Mixing Effect in a Laser Diode", pp. 693-699, (1999), IEEE Transaction on Instrumentation and Measurement, vol. 48, No. 3.

Canesta, Inc., "Data Input Alternatives for Mobile Devices", pp. 1-5, Nov. 28, 2002.

Steinmetz, Robert, et al., "Solving the Data Input Problem in Mobile Devices", pp. 1-6, Sep. 2002.

Tomasi, Carlo, et al., "Full Size Projection Keyboard for Handheld Devices", pp. 70-75, (2003) Communications of the ACM, vol. 46, No. 7.

Hebert, Martial, "Active and Passive Range Sensing for Robotics", pp. 102-110, (2000) IEEE International Conference for Robotics and Automation.

"Laser-Based Tracking for Real-Time 3D Gesture Acquisition", <http://www.k2.t.u-tokyo.ac.jp/fusion/LaserActiveTracking/index-e.html>; first published on or before Aug. 3, 2004.

Aeroflex Mixed-Signal Asics, "Choosing an Ultrasonic Sensor for Proximity or Distance Measurement", Part 1: Acoustic Considerations <http://www.sensorsmag.com/articles/0299/acou0299/main.shtml>; first published in 1999.

Aeroflex Mixed-Signal Asics, "Choosing an Ultrasonic Sensor for Proximity or Distance Measurement", Part 2: Optimizing Sensor Selection <http://www.sensormag.com/articles/0399/0399_28/main.shtml>; first published in 1999.

Canesta Keyboard <http://www.canesta.com/cansetakeyboard.htm>; first published on or after Aug. 3, 2004.

Canesta Keyboard, <http://www.canesta.com/faq.htm>; first published on or after Aug. 3, 2004.

Sahin Kaya Ozdemir, et al., "Velocity Measurement by a Self-Mixing Laser Diode Using Speckle Correlation", IEEE, 1999, pp. 1756-1760.

Wang, W.M., et al., "Self-Mixing Interference Inside a Single-Mode Diode Laser for Optical Sensing Applications," pp. 1577-1587, Journal of Lightwave Technology, vol. 12, No. 9 (1994).

Shaked, Doron, et al., "Graphical Indicia", 2.2 Barcode-Reading Sub-System, <http://www.hpl.hp.com/research/isl/vsb/GraphIndicialCIP.pdf>, first date of publication unknown but, on or before Oct. 13, 2005, 4 pages.

Tsaur, Jiunnjye, et al., "2D Micro Scanner Actuated by Sol-gel Derived Double Layered PZT", National Institute of Advanced Industrial Science and Technology (AIST), <http://toshi.fujita3.iis.u-tokyo.ac.jp/Optical_MEMS_Archives/MEMS%202002/Book/135.PDF>, first date of publication unknown, but on or before 2002, pp. 548-551.

Sasaki, Minoru, et al., "Optical Scanner on a Three-Dimensional Microoptical Bench", Journal of Lighwave Technology, vol. 21, Issue 3, 602, Mar. 2003, <http:/jlt.osa.org/abstract.cfm?id=72540>, 1 page.

Liess, Martin, et al., "A Miniaturized Multidirectional Optical Sensor and Input Device Based on Laser Self-Mixing", Meas. Sci. Technol. 13, 2001-2006; <http://www.iop.org/EJ/abstract/0957-0233/13/12/327>, Nov. 1, 2002; Issue 12; 2 pages.

Gokturk, S. Burak, et al., "A Time-Of-Flight Depth Sensor—System Description, Issues and Solutions," *cvprw*, p. 35, 2004 Conference on Computer Vision and Pattern Recognition Workshop (CVPRW'04), vol. 3, 2004, 9 pages.

"How Does 3DV's Technology Work?", <http://www.3dvsystems.com/technology/technology.html>, first date of publication unknown but on or before Oct. 13, 2005, 7 pages.

Gokturk, Salih Burak, et al., "3D Head Tracking Based on Recognition and Interpolation Using a Time-of-Flight Depth Sensor", *cvpr*, pp. 211-217, 2004 IEEE Computer Society Conference on Computer Vision and Pattern Recognition (CVPR'04)—vol. 2, 2004, 7 pages.

U.S. Appl. No. 10/953,107, filed Sep. 30, 2004.

U.S. Appl. No. 11/154,828, filed Jun. 17, 2005.

U.S. Appl. No. 11/170,182, filed Jun. 30, 2005.

U.S. Appl. No. 11/249,682, filed Oct. 14, 2005.

U.S. Patent Application titled "Laser Velocimetric Image Scanning," filed Nov. 8, 2005, (serial no. not yet assigned).

Logitech® G7 Laser Cordless Mouse; <http://www.logitech.com/index.cfm/products/details/US/EN,CRID=2135,CONTENTID=10716>; date of first publication unknown, but on or before Oct. 24, 2005; 3 pages.

Logitech® MX™ 1000 Laser Cordless Mouse; <http://www.logitech.com/index.cfm/products/details/US/EN,CRID=3,CONTENTID=9043,a_d=g03&srch=1>; date of first publication unknown, but on or before Oct. 24, 2005; 3 pages.

5-Button USB Laser Mouse; <http://www.iogear.com/main.php?loc=product&Item=GME521>; date of first publication unknown, but on or before Oct. 24, 2005; 3 pages.

Houghton, Andrew, et al., "A Method for Processing Laser Speckle Images to Extract High-Resolution Motion" pp. 611-617, Meas. Sci. Technol. 8 (1997), published Feb. 24, 1997.

Yamaguchi, Ichirou, et al., "Stabilized and Accelerated Speckle Strain Gauge", SPIE Conference on Laser Interferometry: Quantitative Analysis of Interferograms: Third in a Series, Aug. 1989; published Sep. 22, 1991; 8 pages.

Taka, Nobukatsu, et al., Displacement Measurement of Speckles Using a 2-D Level-cross Technique, Applied Optics, vol. 22, No. 22, published Nov. 15, 1983; pp. 3514-3519.

D. Dupuy, et al., "Improvement of the FMCW Laser Range-Finder by an APD Working as an Optoelectronic Mixer," IEEE Transactions on Instrumentation and Measurement, 51, 5, pp. 1010-1014, 2002.

R.P. Griffiths, et al., "Cavity-Resonant Optical Position Sensor—a New Type of Optical Position Sensor," p. 328, CLEO, 1998.

Nokia 7110 Phone Features, www.nokia.com/nokia/0,87643598,00.html, Aug. 23, 2005, 3 pp.

Sony Ericsson Mobile Communications-Home Page-Sony Ericsson-T206, www//sonyericsson.co/spg.jspcc=global&Ic=en=&ver=4001&template=ps1_1_5_4&zone=ps&Im=ps1_1&pid=9946, Aug. 23, 2005, 2 pp.

U.S. Official Action mailed Jun. 26, 2007 in U.S. Appl. No. 11/087,263.

U.S. Official Action mailed Aug. 7, 2007 in U.S. Appl. No. 10/953,107.

U.S. Official Action mailed Nov. 14, 2007 in U.S. Appl. No. 11/087,263.

U.S. Official Action mailed Jan. 16, 2008 in U.S. Appl. No. 10/953,107.

U.S. Official Action mailed May 2, 2008 in U.S. Appl. No. 11/135,061.

U.S. Official Action mailed Jul. 15, 2008 in U.S. Appl. No. 11/170,182.

U.S. Official Action mailed Jul. 31, 2008 in U.S. Appl. No. 10/953,107.

U.S. Office Action mailed Jun. 13, 2008 in U.S. Appl. No. 11/170,182.

U.S. Office Action mailed Jul. 15, 2008 in U.S. Appl. No. 11/170,182.

Poujouly et al., "Digital Laser Range Finder: Phase-Shift Estimation by Undersampling Technique", IEEE, 1999, pp. 1312-1317.

U.S. Offical Action mailed Oct. 20, 2008 in U.S. Appl. No. 11/268,747.

* cited by examiner

SPECKLE-BASED TWO-DIMENSIONAL MOTION TRACKING

BACKGROUND

Measuring motion in two or more dimensions is extremely useful in numerous applications. Computer input devices such as mice are but one example. In particular, a computer mouse typically provides input to a computer based on the amount and direction of mouse motion over a work surface (e.g., a desk top). Many existing mice employ an imaging array for determining movement. As the mouse moves across the work surface, small overlapping work surface areas are imaged. Processing algorithms within the mouse firmware then compare these images (or frames). In general, the relative motion of the work surface is calculated by correlating surface features common to overlapping portions of adjacent frames.

These and other optical motion tracking techniques work well in many circumstances. In some cases, however, there is room for improvement. Some types of surfaces can be difficult to image, or may lack sufficient surface features that are detectable using conventional techniques. For instance, some surfaces have features which are often undetectable unless expensive optics or imaging circuitry is used. Systems able to detect movement of such surfaces (without requiring expensive optics or imaging circuitry) would be advantageous.

The imaging array used in conventional techniques can also cause difficulties. In particular, conventional imaging techniques require a relatively large array of light-sensitive imaging elements. Although the array size may be small in absolute terms (e.g., approximately 1 mm by 1 mm), that size may consume a substantial portion of an integrated circuit (IC) die. The imaging array is often the most expensive part of the die, and costs could be reduced if smaller arrays could be used. Moreover, the imaging elements (or pixels) of conventional arrays are generally arranged in a single rectangular block that is square or near-square. When designing an integrated circuit for an imager, finding space for such a large single block can sometimes pose challenges. IC design would be simplified if the size of an array could be reduced and/or if there were more freedom with regard to arrangement of the array.

Another challenge posed by conventional imaging techniques involves the correlation algorithms used to calculate motion. These algorithms can be relatively complex, and may require a substantial amount of processing power. This can also increase cost for imaging ICs. Motion tracking techniques that require fewer and/or simpler computations would provide an advantage over current systems.

One possible alternative motion tracking technology utilizes a phenomenon known as laser speckle. Speckle, which results when a surface is illuminated with a coherent light source (e.g., a laser), is a granular or mottled pattern observable when a laser beam is diffusely reflected from a surface with a complicated structure. Speckling is caused by the interference between different portions of a laser beam as it is reflected from minute or microscopic surface features. A speckle pattern from a given surface will be random. However, for movements that are small relative to spot size of a laser beam, the change in a speckle pattern as a laser is moved across a surface is non-random.

As is known in the art, a line of photosensitive pixels can be used to determine one dimensional movement of a beam spot across a surface. As a laser beam is directed at the surface, a spot of light where the beam strikes the surface is reflected (with speckling) into the line of pixels. By measuring the intensity of light received in the pixels at numerous times, the movement of the surface relative to the pixels can be determined. For a line of n pixels having a pixel pitch (or spacing between pixels) of Δx, the spatial gradient SG between two pixels a and b as intensity readings are taken from those pixels at times t1 and t2 is approximated by Equation 1.

$$SG = \frac{1}{2} * \frac{b(t1) - a(t1) + b(t2) - a(t2)}{\Delta x} \quad \text{Equation 1}$$

In Equation 1, a(t1) and b(t1) are the intensities of light received by pixels a and b at time t1; a(t2) and b(t2) are the intensities of light received by pixels a and b at time t2. The temporal gradient TG of the speckle intensity is approximated by Equation 2.

$$TG = \frac{1}{2} * \frac{a(t2) - a(t1) + b(t2) - b(t1)}{\Delta t} \quad \text{Equation 2}$$

The quantity Δt is the time interval (i.e., sampling time) between t1 and t2. The velocity V of pixels a and b relative to the surface on which the laser is shined can be approximated by Equation 3.

$$V = \frac{TG}{SG} \quad \text{Equation 3}$$

If a similar approximation of V is obtained for all adjacent pixel pairs in the pixel line, those velocities can be combined using Equation 4.

$$V = \frac{\sum_{i=1}^{n-1} SG_i * TG_i}{\sum_{i=1}^{n-1} (SG_i)^2} \quad \text{Equation 4}$$

In Equation 4, i is an index for a pixel pair in the pixel line. The displacement of the surface relative to the pixel line from time t1 to time t2 is simply V*Δt.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, a relatively moving surface is illuminated with a laser. Light from the laser is reflected by the surface into an array of photosensitive elements; the reflected light includes a speckle pattern. Based on outputs of pixels in the array, motion of the array relative to the surface is determined in two dimensions. In some embodiments, sums are calculated for outputs of pixels perpendicular to a dimension along which motion is to be determined. Motion along that dimension is then determined based on spatial and temporal gradients of the calculated sums.

In certain embodiments, the array is square or otherwise rectangular. In other embodiments, the array includes separate arms corresponding to the dimensions along which motion is to be determined, with a space between those arms. In still other embodiments, a computer mouse receiving a speckling-pattern-containing laser reflection determines two dimensional motion based on spatial and temporal gradients in pixel output.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Various exemplary embodiments will be described in the context of a laser speckle tracking system used to measure movement of a computer mouse relative to a desk top or other work surface. However, the invention is not limited to implementation in connection with a computer mouse. Indeed, the invention is not limited to implementation in connection with a computer input device.

Figure 1:
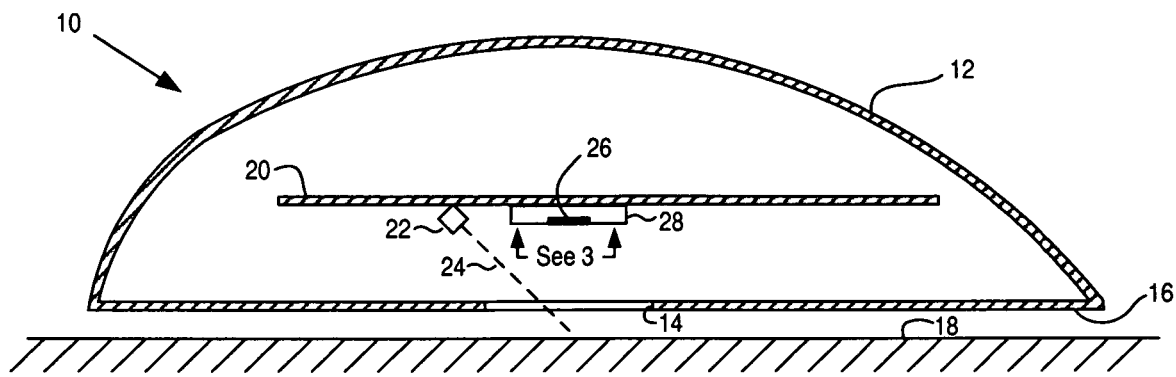
FIG. 1 shows a computer mouse according to at least one exemplary embodiment.

FIG. 1 shows a computer mouse 10 according to at least one exemplary embodiment. Computer mouse 10 includes a housing 12 having an opening 14 formed in a bottom face 16. Bottom face 16 is movable across a work surface 18. For simplicity, a small space is shown between bottom face 16 and work surface 18 in FIG. 1. In practice, however, bottom face 16 may rest flat on surface 18. Located within mouse 10 is a printed circuit board (PCB) 20. Positioned on an underside of PCB 20 is a laser 22. Laser 22 may be a vertical cavity surface emitting laser, an edge emitting laser diode or some other type of coherent light source. Laser 22 directs a beam 24 at a portion of surface 18 visible through opening 14. Beam 24, which may include light of a visible wavelength and/or light of a non-visible wavelength, strikes surface 18 and is reflected into an array 26 of a motion sensing integrated circuit (IC) 28. Because of speckling, the light reaching array 26 has a high frequency pattern of bright and dark regions. Because of this high frequency pattern, the intensity of light falling on different parts of array 26 will usually vary. As mouse 10 moves across surface 18, changes in the pattern of light received by array 26 are used to calculate the direction and amount of motion in two dimensions.

Figure 2:
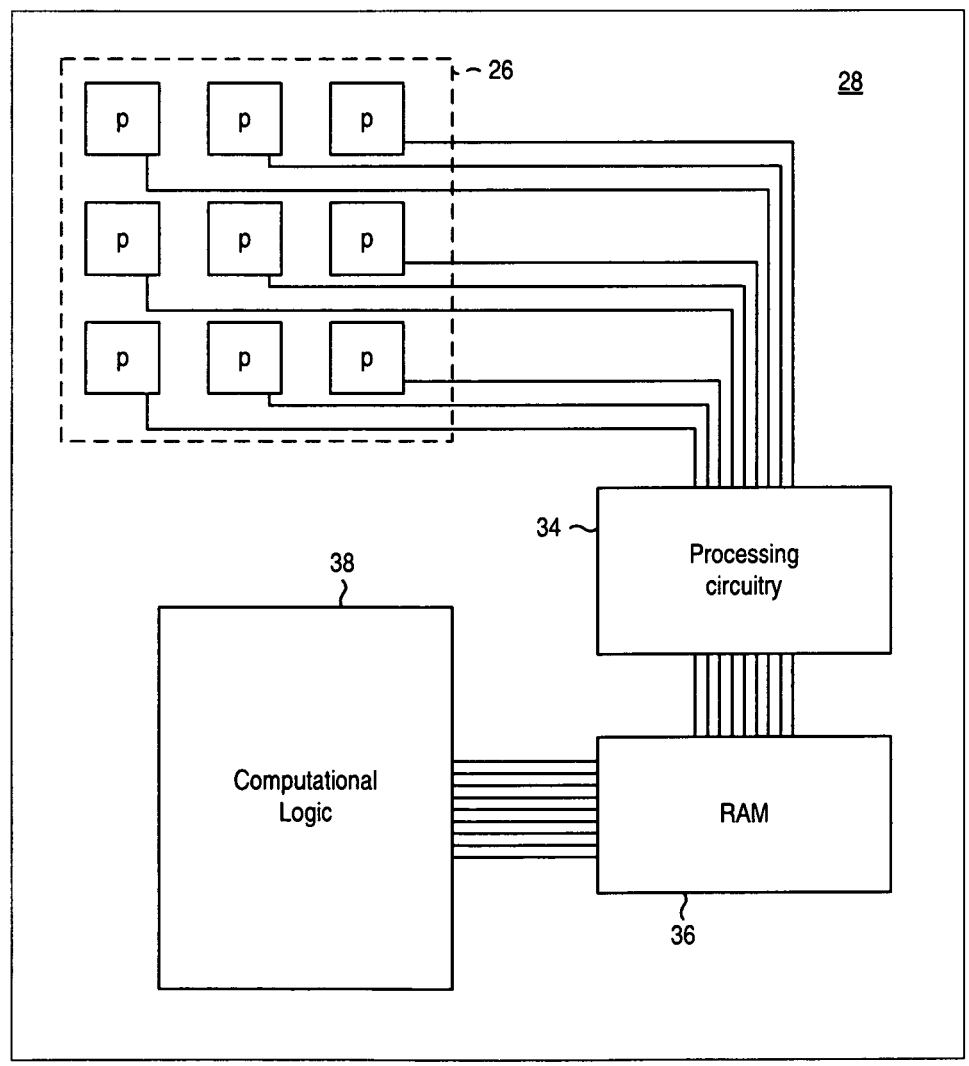
FIG. 2 is a partially schematic block diagram of an integrated circuit of the mouse in FIG. 1.

FIG. 2 is a partially schematic block diagram of IC 28. Array 26 of IC 28 includes a plurality of pixels p. Each pixel p is a photodiode or other photosensitive element which has an electrical property that varies in relation to the intensity of received light. For simplicity, only nine pixels are shown in FIG. 2. As discussed below, however, array 26 may have many more pixels, and those pixels may be arranged in a variety of different ways. At multiple times, each pixel outputs a signal (e.g., a voltage). The raw pixel output signals are amplified, converted to digital values and otherwise conditioned in processing circuitry 34. Processing circuitry 34 then forwards data corresponding to the original pixel output signals for storage in RAM 36. Computational logic 38 then accesses the pixel data stored in RAM 36 and calculates motion based on that data. Because numerous specific circuits for capturing values from a set of photosensitive pixels are known in the art, additional details of IC 28 are not included herein. Notably, FIG. 2 generally shows basic elements of circuitry for processing, storing and performing computations upon signals obtained from an array. Numerous other elements and variations on the arrangement shown in FIG. 2 are known to persons skilled in the art. For example, some or all of the operations performed in processing circuitry 34 could be performed within circuit elements contained within each pixel. The herein-described embodiments are directed to various arrangements of pixels and to details of calculations performed within computational logic 38. Adaptation of known circuits to include these pixel arrangements and perform these calculations are within the routine abilities of persons of ordinary skill in the art once such persons possess the information provided herein.

Figure 3:
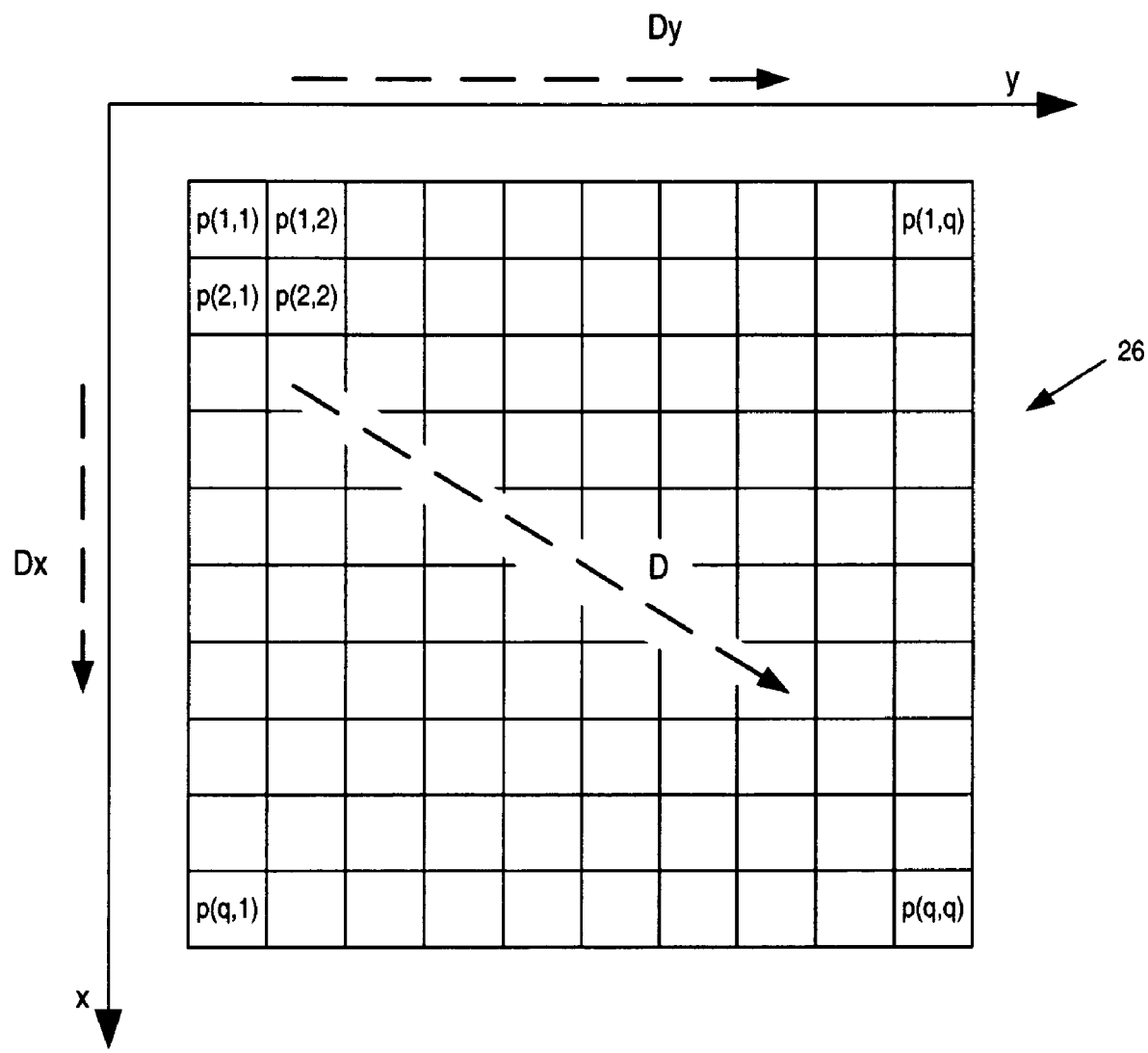
FIG. 3 is a partially schematic diagram of an array in the mouse of FIG. 1.

FIG. 3 is a partially schematic diagram of array 26 taken from the position indicated in FIG. 1. For convenience, pixels in array 26 are labeled p(r, c) in FIG. 3, where r and c are (respectively) the indices of the row and column where the pixel is located relative to the x and y axes. In the embodiment of FIGS. 1 through 3, array 26 is a q by q array, where q is an integer. The unnumbered squares in FIG. 3 correspond to an arbitrary number of additional pixels. In other words, and notwithstanding the fact that FIG. 3 literally shows a ten pixel by ten pixel array, q is not necessarily equal to ten in all embodiments. Indeed, array 26 need not be square. In other words, array 26 could be a q by q' array, where q≠q'.

Data based on output from pixels in array 26 is used to calculate motion in two dimensions. Superimposed on array 26 in FIG. 3 is an arrow indicating the direction in which surface 18 (see FIG. 1) is moving relative to array 26 from time t to time t+Δt. That motion has an x-axis displacement component Dx and a y-axis displacement component Dy. In order to calculate the x-axis displacement Dx, the data based on pixel outputs from each x row are condensed to a single value for time t and a single value for time t+Δt. In particular, the pixel data for each row is summed according to Equations 5 and 6.

$$Sx_t(r) = \sum_{c=1}^{q} pix_t(r, c), \text{ for } r = 1, 2, \ldots q \quad \text{Equation 5}$$

$$Sx_{t+\Delta t}(r) = \sum_{c=1}^{q} pix_{t+\Delta t}(r, c), \text{ for } r = 1, 2, \ldots q \quad \text{Equation 6}$$

In Equation 5, "$pix_t(r, c)$" is data corresponding to the output at time t of the pixel in row r, column c of array 26. Similarly, "$pix_{t+\Delta t}(r, i)$" in Equation 6 is data corresponding to the output at time t+Δt of the pixel in row r, column c of array 26. The x-axis Dx displacement can then be found from equation 7, with Δx being the pixel pitch in the x direction.

$$Dx = \Delta x * \frac{\sum_{r=1}^{q-1} A(r)*B(r)}{\sum_{r=1}^{q-1} B(r)^2},\quad \text{Equation 7}$$

where $A(r)=Sx_t(r+1)-Sx_t(r)+Sx_{t+\Delta t}(r+1)-Sx_{t+\Delta t}(r)$ $B(r)=Sx_{t+\Delta t}(r+1)-Sx_t(r+1)+Sx_{t+\Delta t}(r)-Sx_t(r)$ In order to calculate the y-axis displacement Dy, the pixel data based on pixel outputs from each y column are condensed to a single value for time t and a single value for time t+Δt, as set forth in Equations 8 and 9.

$$Sy_t(c) = \sum_{c=1}^{q} pix_t(r, c), \text{ for } c = 1, 2, \ldots q \quad \text{Equation 8}$$

$$Sy_{t+\Delta t}(c) = \sum_{c=1}^{q} pix_{t+\Delta t}(r, c), \text{ for } c = 1, 2, \ldots q \quad \text{Equation 9}$$

As in Equations 5 and 6, "$pix_t(r, c)$" and "$pix_{t+\Delta t}(r, c)$" in Equations 8 and 9 are data corresponding to the outputs (at times t and time t+Δt, respectively) of the pixel in row r, column c. The y-axis displacement Dy can then be found from Equation 10.

$$Dy = \Delta y * \frac{\sum_{c=1}^{q-1} A(c)*B(c)}{\sum_{c=1}^{q-1} B(c)^2},\quad \text{Equation 10}$$

where $A(c)=Sy_t(c+1)-Sy_t(c)+Sy_{t+\Delta t}(c+1)-Sy_{t+\Delta t}(c)$ $B(c)=Sy_{t+\Delta t}(c+1)-Sy_t(c+1)+Sy_{t+\Delta t}(c)-Sy_t(c)$ In Equation 10, Δy is the pixel pitch in the y-axis direction. In many embodiments, Δy=Δx.

In at least some embodiments, mouse 10 simply sums the Dx and Dy displacements over multiple sampling intervals Δt, and then periodically reports (e.g., in a Human Interface Device (or HID) report) the summed x-axis and y-axis displacements. In other embodiments, the total magnitude (s) and the angle of rotation (θ) of the movement vector are calculated using Equations 11 and 12.

$s=\sqrt{(Dx)^2+(Dy)^2}$ \quad Equation 11

$\tan(\theta)=Dy/Dx$ \quad Equation 12

As can be appreciated, the above-described technique permits determination of two-dimensional motion using relatively simple calculations. Although the above technique assumes that Dx and Dy are less than the pixel pitch, acceptable accuracy is expected when calculating movements of up to 1.2 times pixel pitch. Moreover, a motion-less-than-pixel-pitch limitation (if such a limitation is present) could easily be satisfied by using a sufficiently high sampling rate and/or increased pixel size. For example, with an array having a pixel pitch Δx=Δy and a maximum expected speed of motion (in any direction) of $V_{max}$, Δt could, e.g., be less than approximately $0.5*\Delta x/V_{max}$.

Figure 4:
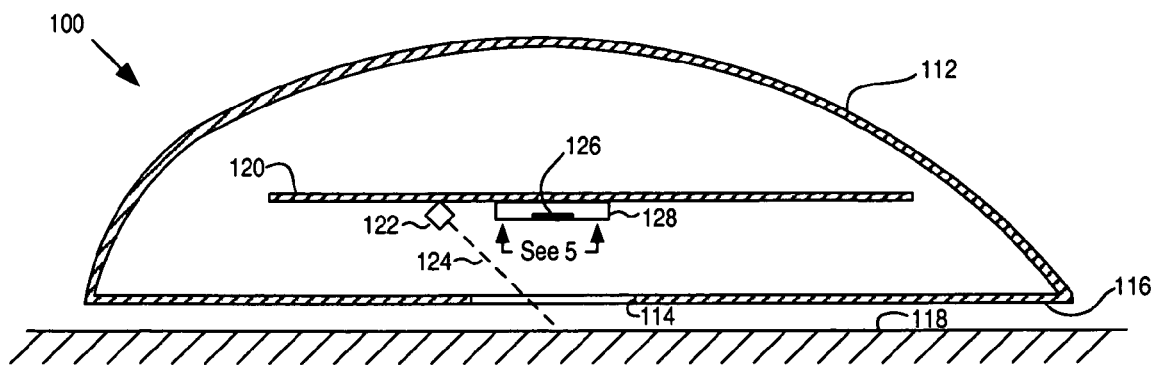
FIG. 4 shows a computer mouse according to at least one other exemplary embodiment.

The embodiment of FIGS. 1 through 3 employs a conventional rectangular array. In other embodiments, an array of reduced size is used. FIG. 4 shows a computer mouse 100 according to at least one such embodiment. As with mouse 10 of FIG. 1, mouse 100 includes a housing 112 having an opening 114 formed in a bottom face 116. Located within mouse 100 on PCB 120 is a laser 122 and motion sensing IC 128. Laser 122, which is similar to laser 22 of FIG. 1, directs a beam 124 onto surface 118. IC 128 is also similar to IC 28 of FIGS. 1 and 2, but includes a modified array 126 and determines motion using a modification of the technique described in connection with FIG. 3.

Figure 5:
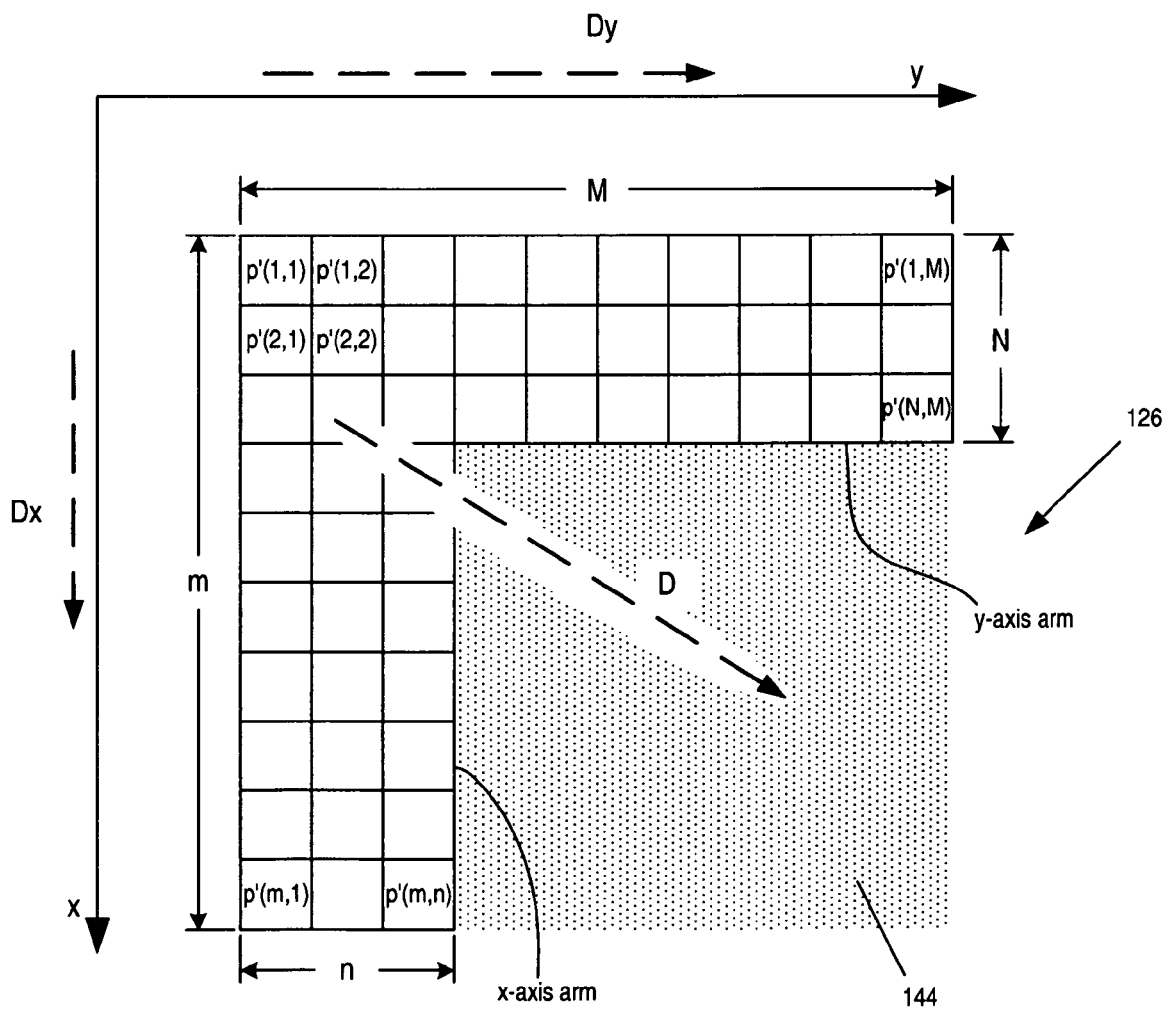
FIG. 5 is a partially schematic diagram of an array in the mouse of FIG. 4.

FIG. 5 is a partially schematic diagram of array 126 taken from the position indicated in FIG. 4. Similar to FIG. 3, pixels in array 126 are labeled p'(r, c), where r and c are the respective row and column on the x and y axes shown. Unlike the embodiment of FIG. 3, however, array 126 is an "L"-shaped array. Specifically, array 126 includes an x-axis arm having dimensions m by n, and a y-axis arm having dimensions M by N. A pixel-free region 144 is located between the x- and y-axis arms. Accordingly, other components of IC 128 (e.g., computational elements, signal processing elements, memory) can be located in region 144. In at least some embodiments, pixel-free region 144 is at least as large as a square having sides equal to the average pixel pitch in the x- and y-axis arms. As in FIG. 3, the unnumbered squares in FIG. 5 correspond to an arbitrary number of pixels. In other words, and notwithstanding the fact that FIG. 5 literally shows M=m=10 and N=n=3, these values are not necessarily the same in all embodiments. Moreover, M need not necessarily equal m, and N need not necessarily equal n.

In order to calculate the x-axis displacement Dx in the embodiment of FIGS. 4 and 5, data based on the pixel outputs from each x row are condensed, for times t and t+Δt, according to Equations 13 and 14.

$$Sx_t(r) = \sum_{c=1}^{n} pix_t(r, c), \text{ for } r = 1, 2, \ldots m \quad \text{Equation 13}$$

$$Sx_{t+\Delta t}(r) = \sum_{c=1}^{n} pix_{t+\Delta t}(r, c), \text{ for } r = 1, 2, \ldots m \quad \text{Equation 14}$$

In Equation 13 and 14, "$pix_t(r, c)$" and "$pix_{t+\Delta t}(r, i)$" are data corresponding to the outputs (at times t and t+Δt, respectively) of the pixel in row r, column c of array 126. The x-axis Dx displacement can then be found from Equation 15, with Δx being the pixel pitch in the x-axis direction.

$$Dx = \Delta x * \frac{\sum_{r=1}^{m-1} A(r)*B(r)}{\sum_{r=1}^{m-1} B(r)^2},\quad \text{Equation 15}$$

where $A(r)=Sx_t(r+1)-Sx_t(r)+Sx_{t+\Delta t}(r+1)-Sx_{t+\Delta t}(r)$ $B(r)=Sx_{t+\Delta t}(r+1)-Sx_t(r+1)+Sx_{t+\Delta t}(r)-Sx_t(r)$ In order to calculate the y-axis displacement Dy in the embodiment of FIGS. 4 and 5, data based on the pixel outputs from each y column are condensed for times t and t+Δt according to Equations 16 and 17.

$$Sy_t(c) = \sum_{r=1}^{N} pix_t(r, c), \text{ for } c = 1, 2, \ldots M \quad \text{Equation 16}$$

$$Sy_{t+\Delta t}(c) = \sum_{r=1}^{N} pix_{t+\Delta t}(r, c), \text{ for } c = 1, 2, \ldots M \quad \text{Equation 17}$$

As in Equations 13 and 14, "$pix_t(r, c)$" and "$pix_{t+\Delta t}(r, c)$" in Equations 16 and 17 are data corresponding to the outputs (at times t and time t+Δt, respectively) of the pixel in row r, column c. The y-axis displacement Dy can then be found from Equation 18.

$$Dy = \Delta y * \frac{\sum_{c=1}^{M-1} A(c)*B(c)}{\sum_{c=1}^{M-1} B(c)^2}, \quad \text{Equation 18}$$

where $A(c) = Sy_t(c+1) - Sy_t(c) + Sy_{t+\Delta t}(c+1) - Sy_{t+\Delta t}(c)$ $B(c) = Sy_{t+\Delta t}(c+1) - Sy_t(c+1) + Sy_{t+\Delta t}(c) - Sy_t(c)$ In Equation 18, Δy is the pixel pitch in the y-axis direction. In many embodiments, Δy=Δx. The total magnitude (s) and the angle of rotation (θ) of the movement vector can also be calculated, using Dx and Dy values from Equations 15 and 18, in the formulae of Equations 11 and 12.

Figure 6A:
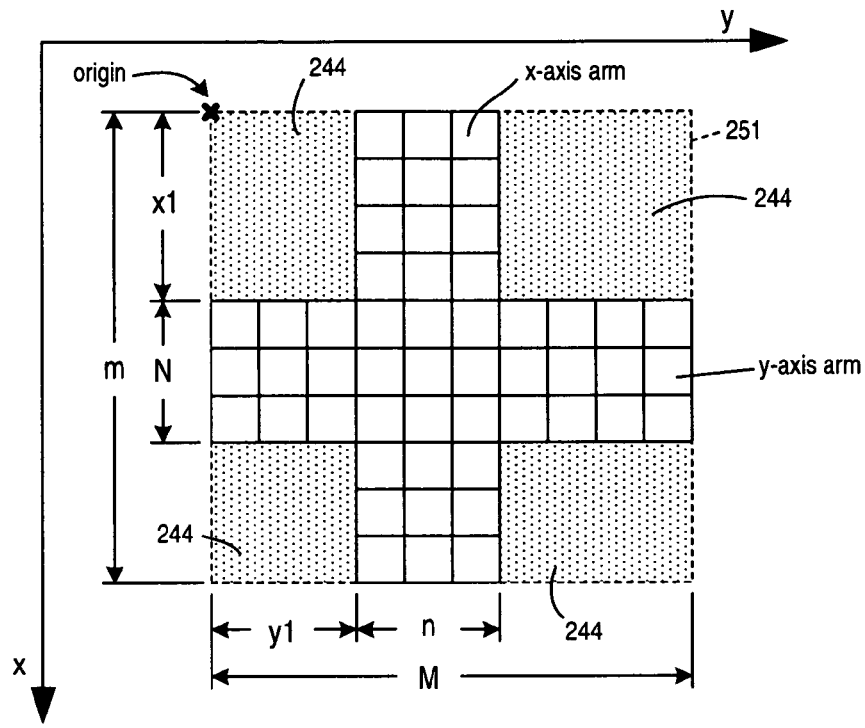
FIGS. 6A and 6B show arrangements of pixels in arrays according to other embodiments.
Figure 6B:
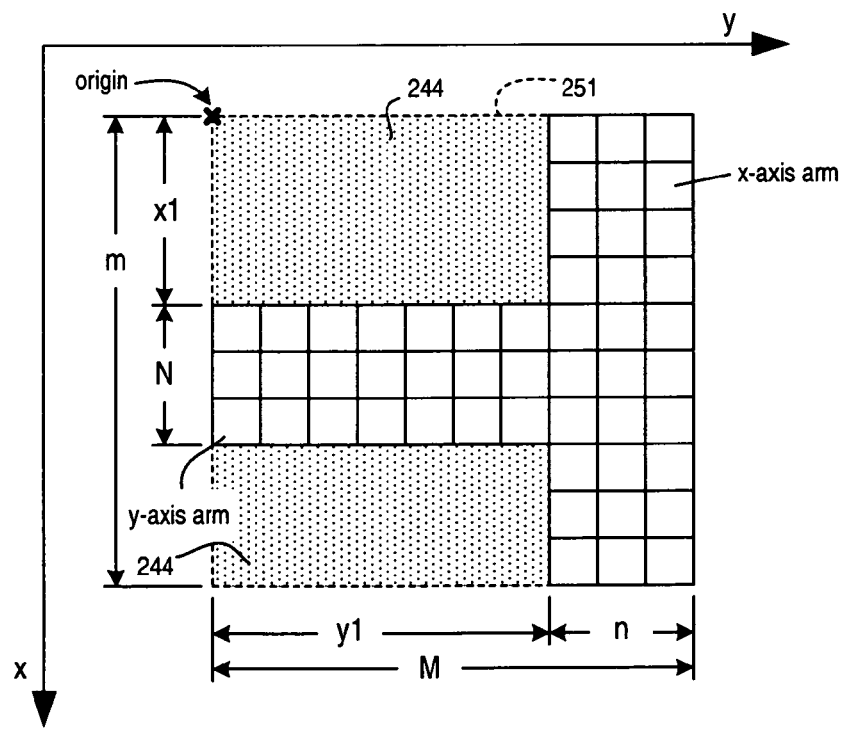

As can be appreciated from FIG. 5, the embodiment of FIGS. 4 and 5 allows additional freedom when designing a motion sensing IC such as IC 128. For example, and as shown in FIGS. 6A and 6B, the x- and y-axis arms of an array can be reoriented in many different ways. In FIGS. 6A and 6B, the x- and y-axis arms still have dimensions m by n and M by N, respectively. However, the relative positioning of these arms is varied. In the examples of FIGS. 6A and 6B, the x- and y-axis arms are contained within a footprint 251, which footprint further includes one or more pixel-free regions 244. In each case, the x-axis arm is offset from an origin of footprint 251 by a number of pixels y1. Similarly, the y-axis arms in FIGS. 6A and 6B are offset from the origins by a number of pixels x1. The quantities M, N, m, n, x1 and y1 represent arbitrary values. For example, x1 in FIG. 6A does not necessarily have the same value as x1 in FIG. 6B (or as x1 in some other pixel arrangement). Indeed, x1 and/or y1 could have a value of zero, as in the case of FIG. 5.

Equations 13 through 18 can be generalized as Equations 19 through 24.

$$Sx_t(r) = \sum_{c=y1+1}^{y1+n} pix_t(r, c), \text{ for } r = 1, 2, \ldots m \quad \text{Equation 19}$$

$$Sx_{t+\Delta t}(r) = \sum_{c=y1+1}^{y1+n} pix_{t+\Delta t}(r, c), \text{ for } r = 1, 2, \ldots m \quad \text{Equation 20}$$

-continued $$Dx = \Delta x * \frac{\sum_{r=1}^{m-1} A(r)*B(r)}{\sum_{r=1}^{m-1} B(r)^2}, \quad \text{Equation 21}$$

where $A(r) = Sx_t(r+1) - Sx_t(r) + Sx_{t+\Delta t}(r+1) - Sx_{t+\Delta t}(r)$ $B(r) = Sx_{t+\Delta t}(r+1) - Sx_t(r+1) + Sx_{t+\Delta t}(r) - Sx_t(r)$ $$Sy_t(c) = \sum_{r=x1+1}^{x1+N} pix_t(r, c), \text{ for } c = 1, 2, \ldots M \quad \text{Equation 22}$$

$$Sy_{t+\Delta t}(c) = \sum_{r=x1+1}^{x1+N} pix_{t+\Delta t}(r, c), \text{ for } c = 1, 2, \ldots M \quad \text{Equation 23}$$

$$Dy = \Delta y * \frac{\sum_{c=1}^{M-1} A(c)*B(c)}{\sum_{c=1}^{M-1} B(c)^2}, \quad \text{Equation 24}$$

where $A(c) = Sy_t(c+1) - Sy_t(c) + Sy_{t+\Delta t}(c+1) - Sy_{t+\Delta t}(c)$ $B(c) = Sy_{t+\Delta t}(c+1) - Sy_t(c+1) + Sy_{t+\Delta t}(c) - Sy_t(c)$ In Equations 19 through 24, x1 and y1 are x- and y-axis offsets (such as is shown in FIGS. 6A and 6B). The quantities $pix_t(r, c)$ and $pix_{t+\Delta t}(r, c)$ are data corresponding to pixel outputs at times t and t+Δt from the pixel at row r, column c. The quantities Δx and Δy are the pixel pitches in the x- and y-axis directions. If x1 and y1 are both zero, Equations 19 through 24 reduce to Equations 13 through 18. If x1 and y1 are both zero, and if M=N=m=n, Equations 19 through 24 reduce to Equations 5 through 10.

Figure 7A:
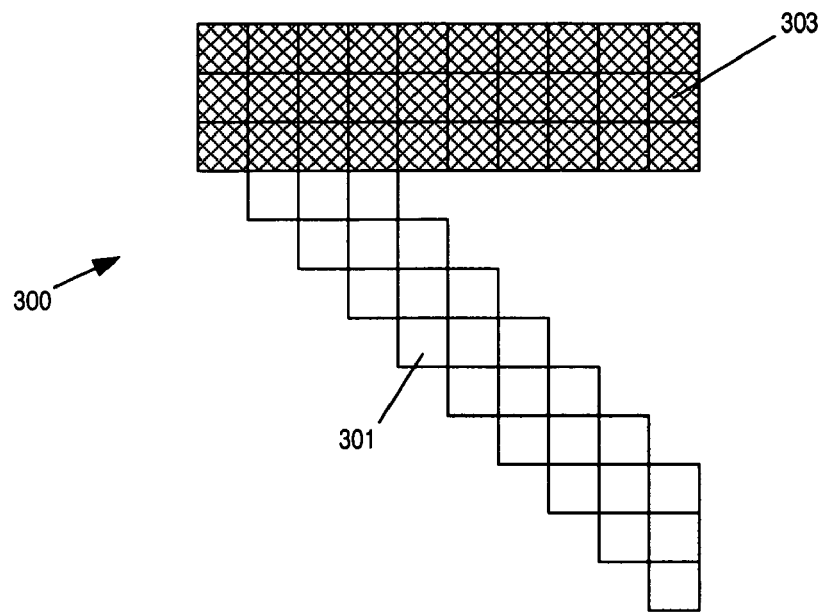
FIGS. 7A and 7B show an arrangement of pixels according to another embodiment.
Figure 7B:
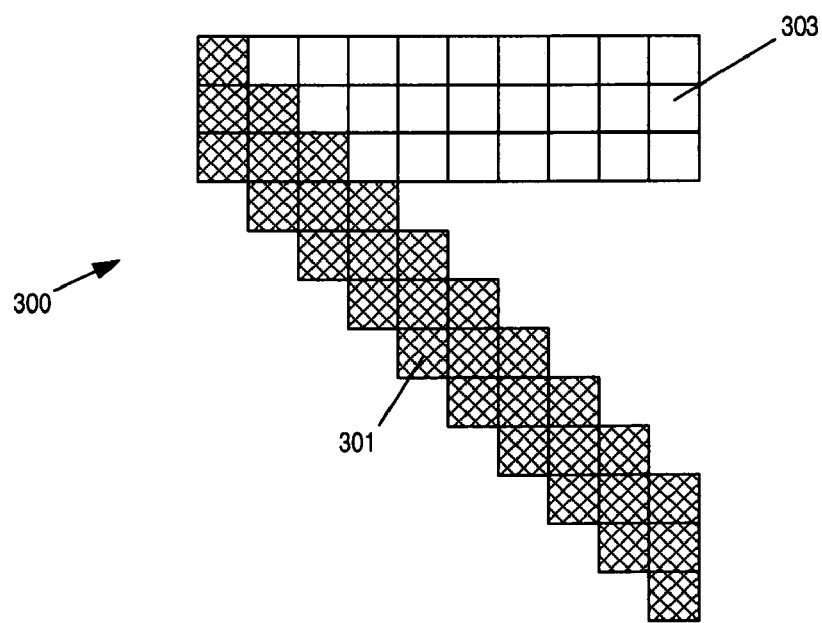

In still other embodiments, the arms of the array are not orthogonal. As shown in FIGS. 7A and 7B, an array 300 has pixels arranged in two arms 301 and 303. Motion relative to array 300 is determined by calculating components along arms 301 and 303. The component parallel to arm 303 is determined using the pixels cross-hatched in FIG. 7A. The component parallel to arm 301 is determined using the pixels cross-hatched in FIG. 7B. Derivation of equations similar to those employed for the embodiments of FIGS. 1 through 6B are within the routine ability of persons skilled in the art, once such persons are provided with the description provided herein.

Although examples of carrying out the invention have been described, those skilled in the art will appreciate that there are numerous variations and permutations of the above described devices that fall within the spirit and scope of the invention as set forth in the appended claims. For example, the arms of an array need not have common pixels. It is to be understood that the subject matter defined in the appended claims is not necessarily limited to the specific features or acts described above. Rather, the specific features and acts described above are disclosed as example forms of implementing the claims. In the claims, various portions are prefaced with letter or number references for convenience. However, use of such references does not imply a temporal relationship not otherwise required by the language of the claims.

The invention claimed is:

1. A method for determining motion in two dimensions, the method including the steps of:
    (a) illuminating a surface with light from a laser;
    (b) receiving the light in an array of pixels arranged in a plurality of rows and columns after the light reflects from the surface, wherein the light includes a speckle pattern and wherein the surface is moving relative to the array, and wherein the array includes a first arm and a second arm and at least one pixel-free region between the first and second arms, the pixel-free region being larger than a square having sides equal to the average pixel pitch within the first and second arms; and
    (c) calculating movement of the surface in two dimensions based on spatial and temporal gradients of output from the pixels in the array.

2. The method of claim 1, wherein
    step (b) includes receiving the light in an array having a first plurality of locations along a first of the two dimensions and a second plurality of locations along a second of the two dimensions, and
    step (c) includes
        (c1) summing, for each of the first plurality of locations, data corresponding to pixel outputs from a subset of the pixels corresponding to that location, and
        (c2) summing, for each of the second plurality of locations, data corresponding to pixel outputs from a subset of the pixels corresponding to that location.

3. The method of claim 2, wherein
    step (b) includes receiving the light in the array at first and at second times, and
    step (c) includes
        (c3) calculating, for each of the first plurality of locations and at each of the first and second times, sums of data corresponding to pixel outputs from the pixel subset corresponding to that location,
        (c4) calculating, for each of the second plurality of locations and at each of the first and second times, sums of data corresponding to pixel outputs from the pixel subset corresponding to that location,
        (c5) calculating movement in the first dimension between the first and second times based on differences between sums resulting from step (c3), and
        (c6) calculating movement in the second dimension between the first and second times based on differences between sums resulting from step (c4).

4. The method of claim 2, wherein
    step (c1) includes, for each of the first plurality of locations, summing data corresponding to pixel outputs from a subset of the pixels arranged in a direction perpendicular to that location, and
    step (c2) includes, for each of the second plurality of locations, summing data corresponding to pixel outputs from a subset of the pixels arranged in a direction perpendicular to that location.

5. The method of claim 2, wherein at least some of the data summed in step (c1) is not included in any of the sums resulting from step (c2).

6. The method of claim 1, wherein the array is rectangular.

7. A method for determining motion in x and y dimensions, the method including the steps of:
    (a) illuminating a surface with light from a laser;
    (b) receiving the light at times t and t+Δt after the light reflects from the surface, wherein
        the light is received in an array moving relative to the surface,
        the array includes pixels lying in pixel positions within a rectangular footprint having an origin,
        the pixel positions lie in rows and columns,
        the array includes a first arm, the first arm including a first sub-array having a size of m pixels in a direction generally parallel to the x dimension and n pixels in a direction generally perpendicular to the x dimension,
        the first arm is offset from the origin by y1 pixel positions,
        the array includes a second arm, the second arm including a second sub-array having a size of M pixels in a direction generally parallel to the y dimension and N pixels in a direction generally perpendicular to the y dimension, and
        the second arm is offset from the origin by x1 pixel positions;
    (c) calculating $$Sx_t(r) = \sum_{c=y1+1}^{y1+n} pix_t(r, c) \text{ for } r = 1 \text{ through } r = m,$$

where r is a row index for a pixel position and c is a column index for a pixel position, and where $pix_t(r, c)$ is a data value based on an output at time t from the pixel at the (r, c) position;
    (d) calculating $$Sx_{t+\Delta t}(r) = \sum_{c=y1+1}^{y1+n} pix_{t+\Delta t}(r, c) \text{ for } r = 1 \text{ through } r = m,$$

where $pix_{t+\Delta t}(r, c)$ is a data value based on an output at time t+Δt from the pixel at the (r, c) position;
    (e) calculating $$Sy_t(c) = \sum_{r=x1+1}^{x1+N} pix_t(r, c) \text{ for } c = 1 \text{ through } c = M;$$

(f) calculating $$Sy_{t+\Delta t}(r) = \sum_{r=x1+1}^{x1+N} pix_{t+\Delta t}(r, c) \text{ for } c = 1 \text{ through } c = M;$$

(g) calculating the x dimension displacement Dx according to $$Dx = \Delta x * \frac{\sum_{r=1}^{m-1} A(r) * B(r)}{\sum_{r=1}^{m-1} B(r)^2},$$

where
    Δx is the pixel pitch in the x dimension,
    $A(r) = Sx_t(r+1) - Sx_t(r) + Sx_{t+\Delta t}(r+1) - Sx_{t+\Delta t}(r)$, and
    $B(r) = Sx_{t+\Delta t}(r+1) - Sx_t(r+1) + Sx_{t+\Delta t}(r) - Sx_t(r)$; and (h) calculating the y dimension displacement Dy according to $$Dy = \Delta y * \frac{\sum_{c=1}^{M-1} A(c) * B(c)}{\sum_{c=1}^{M-1} B(c)^2},$$

where
$A(c)=Sy_t(c+1)-Sy_t(c)+Sy_{t+\Delta t}(c+1)-Sy_{t+\Delta t}(c)$, and
$B(c)=Sy_{t+\Delta t}(c+1)-Sy_t(c+1)+Sy_{t+\Delta t}(c)-Sy_t(c)$.

8. The method of claim 7, wherein at least one of x1 and y1 equals zero.

9. The method of claim 7, wherein $M \neq m$.

10. The method of claim 7, wherein $N \neq n$.

11. A computer mouse, comprising:
   a housing, the housing including an outer surface configured for contact with and movement across a work surface, the housing further including a tracking region in the outer surface through which light may be transmitted from inside the mouse to the work surface;
   a laser positioned to direct a beam through the tracking region to the work surface;
   an array of photosensitive pixels positioned to receive light from the beam after the light reflects from the work surface, wherein the pixels of the away are arranged in a plurality of rows and columns, and wherein the array includes first and second arms and at least one pixel-free region between the arms, the pixel-free region being larger than a square having sides equal to the average pixel pitch within the first and second arms; and
   a processor configured to perform steps that include
      receiving data corresponding to outputs of the pixels, and
      calculating movement of the mouse in two dimensions based on spatial and temporal gradients of the pixel outputs.

12. The mouse of claim 11, wherein the array includes a first plurality of locations along a first of the two dimensions and a second plurality of locations along a second of the two dimensions, and wherein the processor is further configured to perform steps that include
   calculating, for each of the first plurality of locations and at each of first and second times, sums of data corresponding to pixel outputs from a subset of the pixels corresponding to that location, and
   calculating, for each of the second plurality of locations and at each of the first and second times, sums of data corresponding to pixel outputs from a subset of the pixels corresponding to that location.

13. The mouse of claim 12, wherein the processor is further configured to perform steps that include
   calculating movement in the first dimension between the first and second times based on differences between the sums calculated for the first plurality of locations, and
   calculating movement in the second dimension between the first and second times based on differences between the sums calculated for the second plurality of locations.

14. The mouse of claim 12, wherein the subset of pixels corresponding to each of the locations in the first and second plurality is a subset of pixels arranged in a direction perpendicular to that location.

15. The mouse of claim 12, wherein at least some of the data corresponding to pixel outputs included in a sum calculated for a location of the first plurality is not included in any of the sums calculated for locations of the second plurality.

16. The mouse of claim 11, wherein the array is rectangular.

* * * * *

UNITED STATES PATENT AND TRADEMARK OFFICE
CERTIFICATE OF CORRECTION

PATENT NO.        : 7,505,033 B2
APPLICATION NO.   : 11/272415
DATED             : March 17, 2009
INVENTOR(S)       : Li Guo et al.

It is certified that error appears in the above-identified patent and that said Letters Patent is hereby corrected as shown below:

In column 10, line 50, in Claim 7, delete "$Sy_{t+\Delta t}(r)$" and insert -- $Sy_{t-\Delta t}(c)$ --, therefor.

In column 11, line 28, in Claim 11, delete "away" and insert -- array --, therefor.

Signed and Sealed this
Tenth Day of May, 2011

David J. Kappos
*Director of the United States Patent and Trademark Office*